Feb. 6, 1934.  H. J. MALLON  1,945,697
AMUSEMENT AND TRAINING APPARATUS
Filed Aug. 20, 1932   3 Sheets-Sheet 1
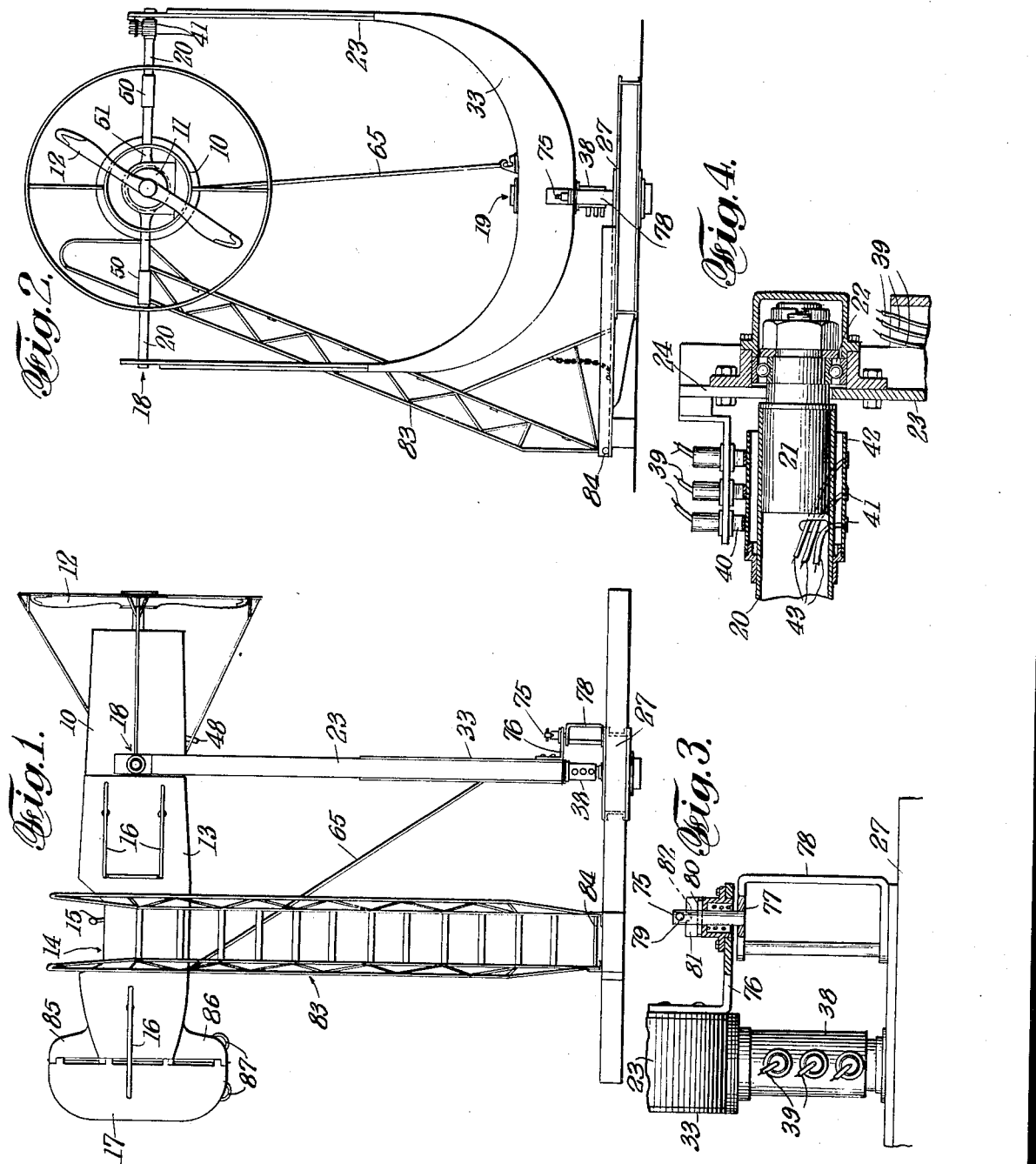
INVENTOR
HUGH J. MALLON
BY
ATTORNEY

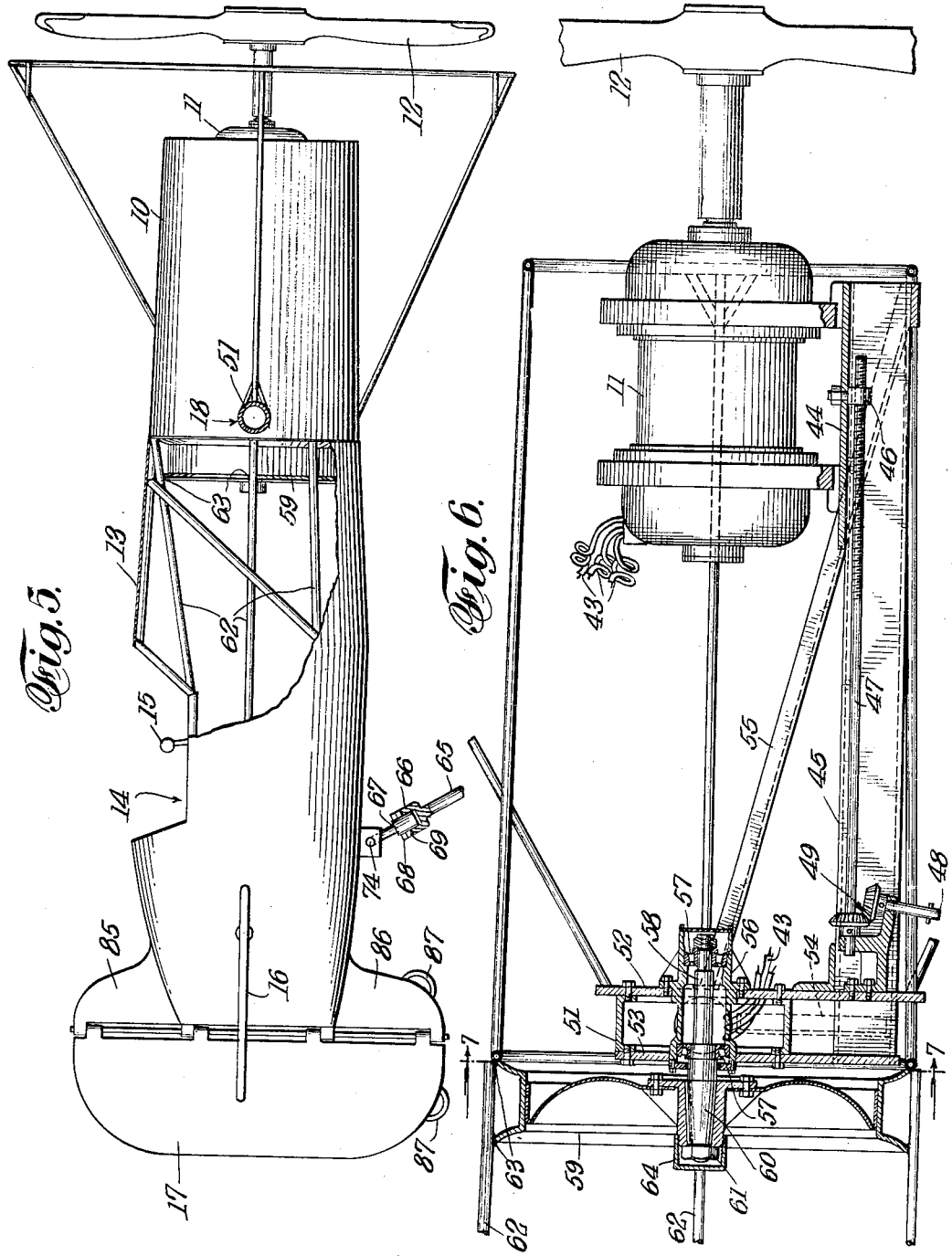

Feb. 6, 1934.  H. J. MALLON  1,945,697
AMUSEMENT AND TRAINING APPARATUS
Filed Aug. 20, 1932   3 Sheets-Sheet 3
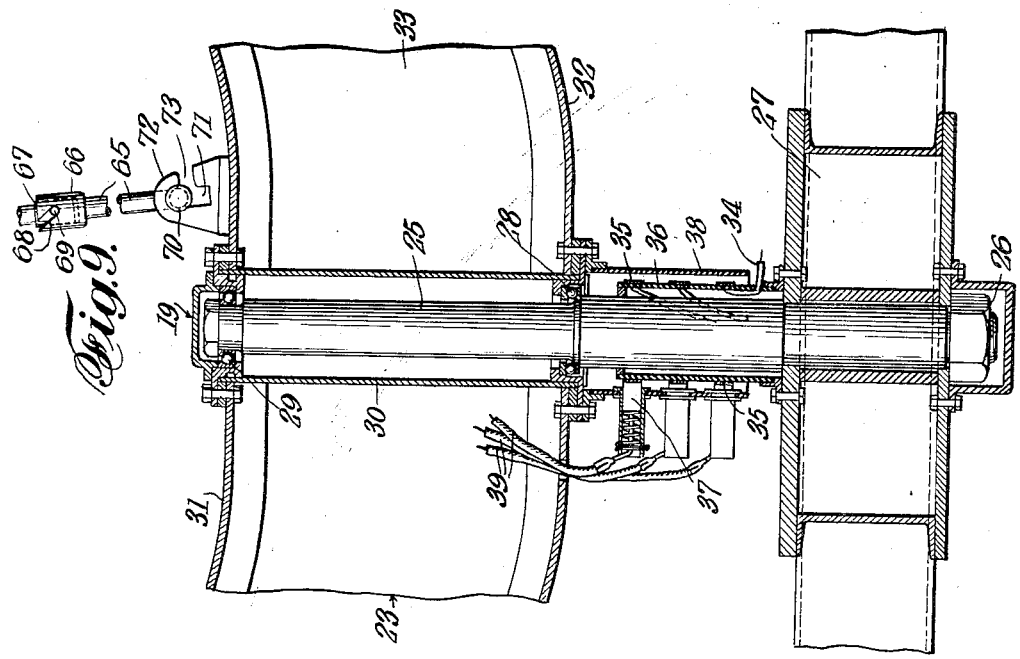
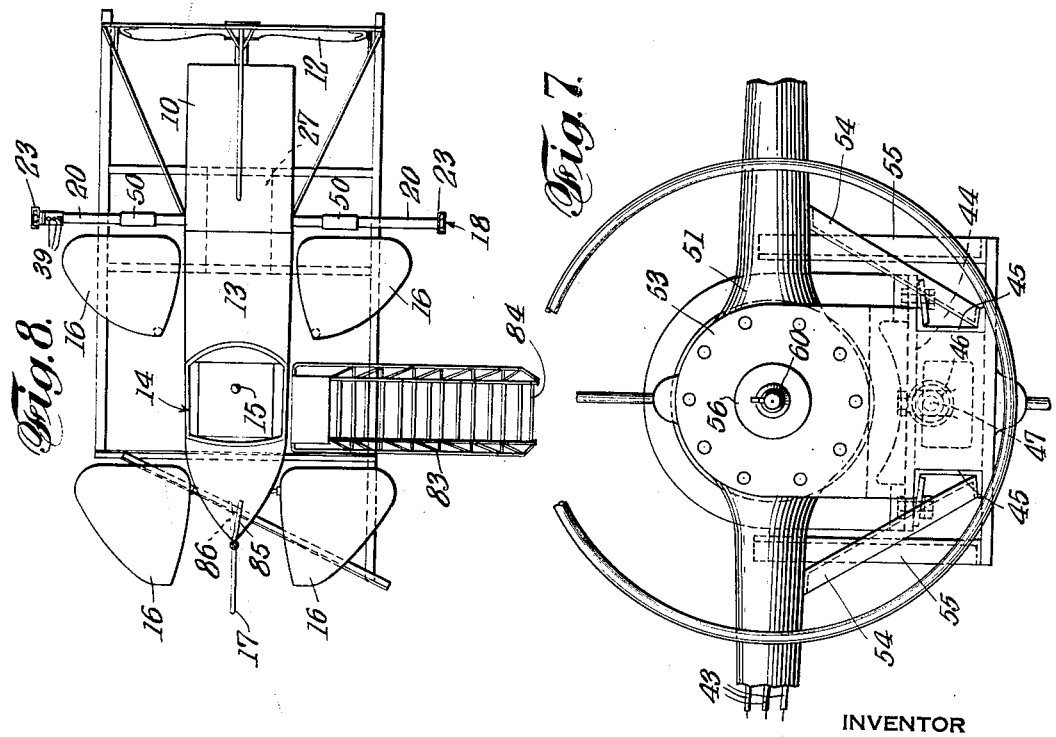
INVENTOR
HUGH J. MALLON
BY
ATTORNEY Patented Feb. 6, 1934

1,945,697

UNITED STATES PATENT OFFICE 1,945,697

AMUSEMENT AND TRAINING APPARATUS

Hugh J. Mallon, West New York, N. J.

Application August 20, 1932. Serial No. 629,586

10 Claims. (Cl. 35—12)

The objects of this invention are to provide apparatus for both amusement purposes and for instruction in handling of aircraft; which will follow closely and therefore simulate to a large extent the action of aircraft; and which will be safe for handling by those inexperienced in aircraft and which will be entirely practical and desirable for the purposes intended.

The drawings accompanying and forming part of this specification illustrate a typical embodiment of the invention, it being understood that structural features may be modified as regards this particular disclosure, all within the true intent and broad scope of the invention.

Fig. 1 is a side elevation of the complete apparatus and Fig. 2 is a front end view of the same.

Figs. 3 and 4 are enlarged broken sectional details, the first of these illustrating the lock mechanism for securing the supporting yoke immovable while loading and unloading passengers and the second illustrating details of the horizontal arbor and current carrying connections for the motor which drives the propeller.

Fig. 5 is a broken partly sectional side elevation of the fuselage.

Fig. 6 is an enlarged broken part longitudinal sectional view of the forward non-rotating portion of the fuselage and the wheel structure by which the rearward relatively rotatable part of the fuselage is carried.

Fig. 7 is a broken view looking forward as on the plane of line 7—7 of Fig. 6.

Fig. 8 is a general plan view of the apparatus.

Fig. 9 is an enlarged broken sectional detail of the bearing for the supporting yoke, illustrating features of the slip connections at this point.

As shown in the assembly views, Figs. 1, 2 and 8, the apparatus comprises a fuselage structure made up of a forward non-rotating section 10, carrying the motor 11, for operating the propeller 12 and a rearward relatively rotatable section 13 having a suitable cabin or cockpit 14 for a passenger or passengers and equipped with a stick or other control 15, by which a passenger may actuate various control surfaces, such as ailerons 16, rudder 17 and the like.

The forward motor carrying section of the fuselage is journalled on a horizontal axis 18, to enable a nosing up or down of the craft and the whole is journalled for movement about a vertical axis 19, to enable lateral steering action.

The horizontal mounting is provided by a tubular member 20 which, as indicated in Fig. 4, has journal spindles 21, set in the opposite ends of the same and mounted in ball bearings or the like 22, bolted to the forks of the supporting yoke 23. These forks are indicated as slotted downward from their upper ends at 24 to enable the structure to be assembled by simply lowering the horizontal spindles of the device down into position in the ends of the yoke.

The vertical pivoting of the yoke is provided for in the illustration by means of a fixed spindle 25, Fig. 9, secured stationary at 26 in the base structure 27, and carrying vertically spaced ball bearings 28, 29, or the like, which carry the bearing tube 30 in the lower central portion of the yoke. The yoke is indicated as made up of channels 31, 32, spaced relatively widely apart at the bottom of the yoke and arranged, the first mentioned, at the inside of the yoke with its flanges faced outwardly and the second, at the outside of the yoke with its flanges faced inwardly and said flanges connected by yoke-shaped cover plates 33, welded or otherwise suitably secured to the channels. This provides a strong but relatively light structure and the wider spacing with the attached cover plates at the bottom gives a desirable bracing effect and provides room for a relatively long journal sleeve as shown.

Because of the relatively small size for horsepower developed, a three phase motor is usually employed. The necessary three phase connections are indicated only in a general way, the important features of the same being that slip connections are provided at both the vertical and the horizontal pivots.

In Fig. 9, the power connections are indicated at 34, led to three slip rings 35, carried by an insulating support 36, surrounding the pivot stud and contacted by brushes 37, carried by an insulating sleeve 38, dependent from the bottom of the yoke and covering the slip rings. From these brushes, connections 39 are carried up through the hollow yoke between the opposing flanges of the two channel members to brushes 40 on one arm of the yoke, said brushes engaging slip rings 41 on an insulating support 42, fixed on one horizontal spindle 20, wiring 43 being extended from these slip rings through the hollow spindle and thence to the motor. A suitable control switch for these power connections is provided at some point, usually in some convenient position adjoining the apparatus, where an attendant can observe and exercise a supervisory control.

The motor is shown as mounted on a base 44, slidable along the channels 45 and having at the other side of the same a nut block 46, engaged by a screw shaft 47, operable from a stub shaft 48 by bevel gearing 49. By connecting a suitable operating crank with shaft 48, it will be seen that the motor may be bodily shifted lengthwise of the fuselage to balance the craft more or less for passengers of different weights.

The tubular spindles 20 for the horizontal mounting of the craft may be simply lengths of tubing welded or otherwise secured, as by sleeves 50, Fig. 2, to the ends of an ordinary hollow automobile rear axle housing 51 designed to contain the usual rear axle differential and rear axle sections, the front and rear cover plates of such axle housing being replaced by front and rear frame plates 52, 53, Fig. 6, which serve as supports for the forwardly extending motor mounting channels 45 and other parts. Inclined braces 54, 55, are shown extended from the axle housing downwardly and forwardly to the forwardly projecting motor mounting frame. A long bearing sleeve 56, Fig. 6 is shown mounted in and carried by the front and back frame plates 52, 53, and as carrying longitudinally spaced bearings 57 for a spindle 58, forming the carrier for the rotatable fuselage section.

A practical and economical method of mounting this rear fuselage section is through the medium of a disc wheel, such as indicated at 59, Fig. 6, secured on the tapered projecting portion 60, of the rotatable spindle by nut 61. To the rim portion of this wheel, a fuselage framing, such as indicated at 62, may be secured at 63, as by welding or otherwise.

The construction last described thus consists generally of a fuselage frame secured at its forward end to the rim of a disc wheel, which latter is engaged over and secured on the end of a projecting shaft journalled in the forward non-rotating section of the fuselage. This shaft may in fact be the end portion of a rear axle, which is already formed with a tapered seat to take the hub of a disc wheel and may have suitable shoulders turned thereon to fit the spaced bearings 57. A guard cap 64 is shown screwed to the hub of the disc wheel, which cap in fact may be an ordinary hub cap. Upon removal of this cap and the nut 61, it will be seen that the entire rotatable assembly of the fuselage may be lifted off.

To hold the passenger compartment against rotating and the entire craft against tipping while passengers are entering or leaving the same, there is provided in the illustration, a holding and bracing rod 65, having at its upper end a socket 66, Figs. 5 and 9, to engage over a stud 67, dependent from the rotatable fuselage section, said socket being slotted at 68, to engage with a turning movement over a locking pin 69 on the dependent stud and the lower end of the rod having an angularly turned tip 70 to hook through a slot 71 in bracket 72 on the yoke. It will be noted that the upper end of the rod may be coupled to the fuselage, by simply engaging and turning the socketed end of the rod over the fuselage stud and that by then hooking the lower end of the rod in the bracket 72, where it is held against backward turning, the fuselage will be held against both tilting and rotary movements. The slot in the bracket may open at the upper side of the same as indicated at 73, Fig. 9, so as to permit the stay rod 65, when properly turned, being readily linked in interlocked relation to the bracket. The dependent coupling stud at the fuselage is shown as pivotally supported at 74, Fig. 5, to allow necessary freedom for the coupling movements described.

The yoke is held against turning on its vertical axis when loading and unloading passengers by dropping a spring thrust bolt 75, carried by bracket 76, outstanding from the front of the yoke, Figs. 1 and 3, into a socket 77 provided in a stationary bracket 78 upstanding from the base. This bolt may be locked in retracted inactive relation by lifting and turning it by means of a cross handle 79, so as to carry the transverse holding pin 80, up out of the deep slot 81, in the mounting bracket and into a higher level cross slot 82.

The passengers may be loaded and unloaded by means of a movable platform or gangway, or the like, or as in the illustration, by means of a lattice-work ladder 83, pivoted on the base at 84 and adapted to be swung up to the ship or back out of the way, clear of the yoke and other movable portions of the apparatus.

To steady the movable portion of the craft in the air stream of the propeller, vertical tail fins 85, 86, may be provided above and below the fuselage, inclined in opposite directions as in Fig. 8, to compensate for the twist of the propeller stream and hence overcome too much tendency of "spinning". The rudder is shown as of large size extending both above and below the fuselage and hinged to these vertical fins. Handholds 87 are shown provided on the lower fin and the lower edge of the rudder for convenience in shifting the movable fuselage section, when required.

The apparatus is strong and durable and can be manufactured relatively inexpensively because of the utilization of more or less standard parts, such as the rear axle housing, section of rear axle, disc wheel, etc. The movable control surfaces carried by the passenger compartment take hold of the air stream created by the propeller, sufficiently to execute the various evolutions of rising, diving, rolling, looping, dipping, etc., and in addition to affording amusement, provide actual training and instruction in the handling of aircraft. Instead of a complete disc wheel, portions of the same may be utilized, such as the hub part and a specially formed disc reinforced and better suited to the mounting of the fuselage frame may be used with such hub part.

What is claimed is:

1. Apparatus of the character disclosed, comprising in combination, a U-shaped member composed of U-shaped channels one inside the other and arranged with the flanges of the inner channel faced outwardly and the flanges of the outer channel faced inwardly, said channels being spaced at the middle portion of the U-shaped member, cover plates overlying the flanges and securing the channels together at said spaced middle portions of the same, a pivotal mounting for said middle portion of the U-shaped member, a motor support pivoted horizontally in the arms of the U-shaped member, a motor mounted on said support, a propeller operated by said motor and a fuselage structure pivoted to said motor support and having movable control surfaces disposed in the air stream of said propeller.

2. In apparatus of the character disclosed, the combination of an automobile rear axle housing, journals rotatably supporting the opposite ends of the same, front and back frame plates secured to the opposite sides of said axle housing, a bearing sleeve supported by said frame plates, an automobile axle section having a tapered hub portion and journalled in said bearing sleeve with the tapered hub portion of the same protruding therefrom, a disc having a hub secured over said projecting portion of the axle section, a fuselage frame secured to said disc, control surfaces carried by said fuselage frame and means for creating an air stream against said control surfaces.

3. In apparatus of the character disclosed, the combination of an automobile rear axle housing, journals rotatably supporting the opposite ends of the same, front and back frame plates secured to the opposite sides of said axle housing, a bearing sleeve supported by said frame plates, an automobile axle section having a tapered hub portion and journalled in said bearing sleeve with the tapered hub portion of the same protruding therefrom, a disc having a hub secured over said projecting portion of the axle section, a fuselage frame secured to said disc, control surfaces carried by said fuselage frame, means for creating an air stream against said control surfaces, including a propeller, a motor for driving said propeller and framing carried by said frame plates for supporting said motor.

4. Aircraft instructing and amusement apparatus, comprising a yoke mounted for swinging movements about a vertical axis, a motor mount journalled for movement about a horizontal axis in said yoke, a fuselage structure carried by said motor mount, a stay rod having a twisting slot and pin connection with the fuselage at one end and coupling means between the opposite end of said rod and the yoke for holding the rod against an untwisting movement of the same.

5. In apparatus of the character disclosed, the combination of a yoke structure and a fuselage mechanism pivotally supported therein, a stay rod for temporarily securing the fuselage in fixed position in the yoke, said stay rod having a twisting slot and pin connection at one end and an untwisting-restraining coupling at its opposite end and whereby said rod is retained in the position holding the fuselage structure coupled immovablly to the yoke structure.

6. In apparatus of the character disclosed, the combination of a section of an automobile rear axle having a tapered end portion, a disc wheel having its hub portion removably secured over said tapered end portion of the axle section, a fuselage frame secured to the rim of said disc wheel and a mounting for the axle section.

7. In apparatus of the character disclosed, the combination of a section of an automobile rear axle having a tapered end portion, a disc wheel having its hub portion removably secured over said tapered end portion of the axle section, a fuselage frame secured to the rim of said disc wheel, a mounting for the axle section, including a long bearing housing and spaced bearings for the axle section seated in said housing.

8. In aircraft training and amusement apparatus, the combination of an automobile rear axle housing, front and back frame plates secured thereto, framing carried by said plates, a motor mounted on said framing, a propeller driven by said motor, a shaft journalled in the frame plates and a fuselage structure carried by said shaft and including controllable air surfaces in the slip stream of the propeller.

9. In aircraft training and amusement apparatus, the combination of an automobile rear axle housing, front and back frame plates secured thereto, framing carried by said plates, a motor mounted on said framing, a propeller driven by said motor, a shaft journalled in the frame plates, a fuselage structure carried by said shaft and including controllable air surfaces in the slip stream of the propeller, electrical connections for the motor extending through the axle housing, pivotal mountings for the axle housing and slip ring connections at said pivotal mountings for the conductors within the axle housing.

10. Aircraft training and amusement apparatus, comprising a fuselage structure, a shaft supporting and extending longitudinally of the same, a bearing rotatably supporting said fuselage structure carrying shaft, a horizontal support extending transversely of the fuselage structure and carrying said shaft bearing, an upstanding yoke having bearings rotatably supporting the ends of said horizontal support and mounted for swinging movements about a vertical axis, means for directing an air stream on said fuselage structure and variable control surfaces on said fuselage structure in said air stream.

HUGH J. MALLON.